US006769732B2

United States Patent
Sakyo (10) Patent No.: US 6,769,732 B2
(45) Date of Patent: Aug. 3, 2004

(54) CABIN FOR CONSTRUCTION MACHINERY (75) Inventor: Tsuyoshi Sakyo, Nihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/926,636

(22) PCT Filed: May 28, 2001

(86) PCT No.: PCT/JP01/02529
§ 371 (c)(1),
(2), (4) Date: Nov. 28, 2001

(87) PCT Pub. No.: WO01/73216
PCT Pub. Date: Oct. 4, 2001

(65) Prior Publication Data
US 2002/0135207 A1 Sep. 26, 2002

(30) Foreign Application Priority Data
Mar. 28, 2000 (JP) .......................................... 2000-089171

(51) Int. Cl.[7] .............................................. B60R 21/13
(52) U.S. Cl. ............................. 296/190.03; 296/190.08
(58) Field of Search ....................... 296/190.08, 190.03, 296/200, 201; 362/493, 459, 549

(56) References Cited

U.S. PATENT DOCUMENTS

| 4,702,516 A | * | 10/1987 | Martin, Jr. |
| 5,481,441 A | * | 1/1996 | Stevens |
| 6,155,632 A | * | 12/2000 | Fujimoto |
| 2002/0011743 A1 | * | 1/2002 | Tiziano |

FOREIGN PATENT DOCUMENTS

| JP | 62-99661 | 6/1987 |
| JP | 63-176851 | 11/1988 |
| JP | 7-34486 | 2/1995 |

* cited by examiner

Primary Examiner—Jason Morrow
(74) Attorney, Agent, or Firm—Oblon, Spivak, McClelland, Maier & Neustadt, P.C.

(57) ABSTRACT

A cabin (10) of construction machinery disposed on an upper structure (2) having a front working machine installed thereon, comprising a first side structural body (11) having an openable door (20) provided thereon, a second side structural body (10) disposed at a position adjacent to the front working machine (7), a front part (13) provided between both side structural bodies (11) and (12) and having a front window (23) generally on the entire surface thereof, a roof part (15), and a rear surface part (14), wherein a lateral rail (26) is provided at the upper position of the front window (23) and a reinforcing member (30) for reinforcing the lateral rail (23) is installed across the first and secon side structural bodies (11) and (12).

6 Claims, 14 Drawing Sheets

CABIN FOR CONSTRUCTION MACHINERY

FIELD OF THE ART

This invention relates generally to construction machines such as hydraulic power shovel type excavators and the like, and more particularly to a cab for a construction machine, providing a reinforced operating room for an operator at the control of the construction machine.

TECHNICAL BACKGROUND

In the case of hydraulic power shovel type excavators, a crawler- or wheel-type drive is mounted on a frame of a vehicular base carrier, and an upper rotary body is mounted on the base carrier through a rotary mechanism. Further, a front working mechanism is mounted on top of the upper rotary body to perform ground excavating operations. The front working mechanism is largely constituted by a boom, an arm and a front attachment. For a ground excavating operation, a bucket is attached to the arm. The base end of the boom, which constitutes the front working mechanism, is pivotally supported on the upper rotary body, and lifted up and down by means of a hydraulic cylinder. The arm is pivotally supported on a fore end portion of the boom and turned up and down relative to the boom by means of a hydraulic cylinder. The bucket as a front attachment is connected to a fore end portion of the arm through a link mechanism and turned toward and away from the arm similarly by means of a hydraulic cylinder.

The operations of the hydraulic power shovel type excavator, including drive of the vehicular base carrier, rotations of the upper rotary body by the rotary mechanism and operations of the front working mechanism, are controlled by an operator on the upper rotary body. For this purpose, a cab is provided on the upper rotary body, and an operator's seat to be seated by an operator is provided in the cab, along with operating levers or other operating means. In order to operate the excavator smoothly, it is necessary for the operator to have a broad view field on each side. More particularly, it is necessary for the operator to have a wide view field not only on the front and rear sides of the cab but also on the right and left sides and, in the case of a ground excavating operation, in downward and upward directions. In this regard, a wide and clear view filed needs to be secured especially in directions forward of the cab, including obliquely upward or obliquely downward directions. Therefore, the front side of the cab is almost entirely constituted by an window or windows. In some cases, a top window is provided in the roof of the cab continuously from a front window.

A cab is mounted on the upper rotary body of the excavator. Considering vibrations which are transmitted to the cab while the hydraulic power shovel type excavator in operation and possibilities of collisions against a nearby structural body, rocks or trees, the cab should have high strength as a structure. Normally, a cab is constituted by an enclosure including front and rear sections, right and left side sections and a roof section. A door is provided in one of the side sections of the cab to permit an operator get into and get out of the cab, and the other side section is located in a position in the proximity of a front working mechanism. A plural number of pillars are erected in the right and left side sections, and beams are bridged between the respective pillars. Normally, the pillars and beams are each constituted by a steel plate which is formed in a hollow columnar shape, and, for example, are assembled integrally with each other in the shape of an inverted U-shape. Accordingly, each side section of the cab is constituted by a frame structure which is composed of pillars and a beam member, and either a door or a window is fitted in the frame structure. The cab has a similar frame structure on its rear side. Thus, it is primarily the side and rear frame structures on the right, left and rear sides of the cab that contribute to the structural strength of the cab itself. The roof section of the cab is also constituted by a steel plate, but hollow panel structures are employed in some cases to increase the strength of the roof section.

As already explained hereinbefore, on the front side, the cab enclosure is provided with a large window, which occupies almost the entire areas of the front section, for the purpose of ensuring a wide view field in forward directions. Therefore, in a case where a top window is additionally provided in the roof section for securing a view field in upward directions, the cab inherently has weak points in transitional portions from the front section to the roof section, as compared with other portions of the cab. In order to avoid this problem, a transverse or cross beam is bridged between the two side sections and in a transitional portion from the front to the top window for reinforcing purposes. This reinforcing transverse beam of this sort however will block a view field of an operator in the cab to a considerable degree if its thickness is increased from the standpoint of enhancing the strength of the cab.

Therefore, it is desirable to impart necessary strength to the cab by increasing the strength of the frame structures of the side and rear sections instead of providing a thick reinforcing member in transitional portions from the front to roof window of the cab. This approach makes it possible to prevent the cab from easily undergoing crucial deformation or damages when impacts of certain magnitudes are externally applied thereto, while securing a broader view field for the operator both in forward and upward directions.

In operation, a hydraulic power shovel type excavator is often required to run on rough terrains with undulations and sporadically spotted with mounds and dimples. Therefore, the excavator can lose its balance while running on such a rough terrain. In the case of a crawler type excavator having a crawler type drive means on the vehicular base carrier, it is unlikely for the machine to fall down on its side even if it loses balance while in travel, because crawler belts have broad treading surface areas. However, the machine can fall down under certain circumstances, for example, in a case where the machine itself is ill-balanced and erroneously operated by an operator.

A front working mechanism is provided on an upper rotary body of an excavator, on one side of a cab, normally on the right side of a cab, when seen by an operator who is seated forward on an operator's seat in the cab. Therefore, when an excavator happens to fall down to that side, there is little possibility of a falling load acting directly on the cab. However, should an excavator fall down to the opposite side, it is likely that a falling load of extremely large magnitude acts directly on the cab. In addition, in the case of a hydraulic power shovel type excavator having a cab and a front working mechanism at a close distance from each other for the purpose of minimizing the width of the machine, one side of the cab is subjected to impacts of collision against the ground and as a result the other side of the cab is collided against a closely opposing side of the front working mechanism. Therefore, on such an occasion, the cab is crushed and deformed from opposite sides easily if a falling load is imposed on a transitional portion between front to top windows of the cab where the strength against a lateral load is relatively low.

DISCLOSURE OF THE INVENTION

With the foregoing situations in view, it is an object of the present invention to provide a cab for a construction machine, employing a reinforcing means in its structure to impart high strength and shape retainability to the cab for preventing crucial deformation or collapsing even in the event the cab is subjected to a load of a large magnitude like a falling load, while guaranteeing a wide view field for an operator in the cab.

It is another object of the present invention to provide a cab for a construction machine like a power shovel type excavator, which can protect an operator in the cab safely even when the excavator happens to fall down on a ground while in operation.

In accordance with the present invention, for achieving the above-stated objectives, there is provided a cab for a construction machine, being mounted on an upper rotary body of the construction machine along with a working mechanism and providing an operating room within an enclosure consisting of a first side frame structure containing a door to be opened and closed by an operator, a second side frame structure located on the side of the working mechanism, a front section provided between front ends of the first and second side frame structures and substantially entirely occupied by a front window, a roof section, and a rear section, characterized in that the cab comprises: a cross beam member bridged between upper front corners of the first and second side frame structures to extend along upper side of the front window; and a reinforcing beam member provided between the first and second side frame structures for reinforcing the cross beam member.

In a case where the roof section is provided with a roof window in a front portion thereof, preferably the cross beam is located in boundary regions between the front and roof windows. The reinforcing beam member should be located in a position where it will not block a view field of an operator in the cab to any objectionable degree. In this regard, preferably the reinforcing beam member is in the shape of a rod and located substantially in parallel and overlapping relation with the cross beam member. By so arranging, the reinforcing beam member can be substantially concealed behind cross beam member without blocking a view field of an operator when the operator who is seated on an operator's seat in the cab looks up in an obliquely upward direction toward the cross beam member between the front and roof windows of the cab. The opposite ends of the reinforcing beam member are securely connected to the first and second side frame structures. In a preferred form of the invention, the reinforcing beam member is bridged between brackets securely fixed to a front or lateral side of foremost pillars of the first and second side frame structures. The reinforcing beam member which is provided on the outer side of the cab can be for mounting accessories of the construction machine, for example, accessories such as lighting lamp assemblies, mirrors, protector covers for dropping rocks or stones, sun shades, wipers etc. In a case where the cross beam member is constituted by a hollow columnar structure, the reinforcing beam member can be passed through an internal hollow cavity of the cross beam member. In any case, the reinforcing beam member should have high bending strength. Preferably, the reinforcing beam member is constituted by a metal pipe of a circular shape or triangular, square or other polygonal shape in cross section. In order to enhance the bending strength, a foaming resin such as foaming urethane can be filled in the internal cavity of the pipe.

BEST MODE FOR CARRYING OUT THE INVENTION

Hereafter, the present invention is described more particularly with reference to the accompanying drawings. Shown schematically in FIGS. 1 and 2 is the general layout of a hydraulic power shovel type excavator as an example of construction machine, and in FIG. 3 is a cab of the excavator.

Figure 1:
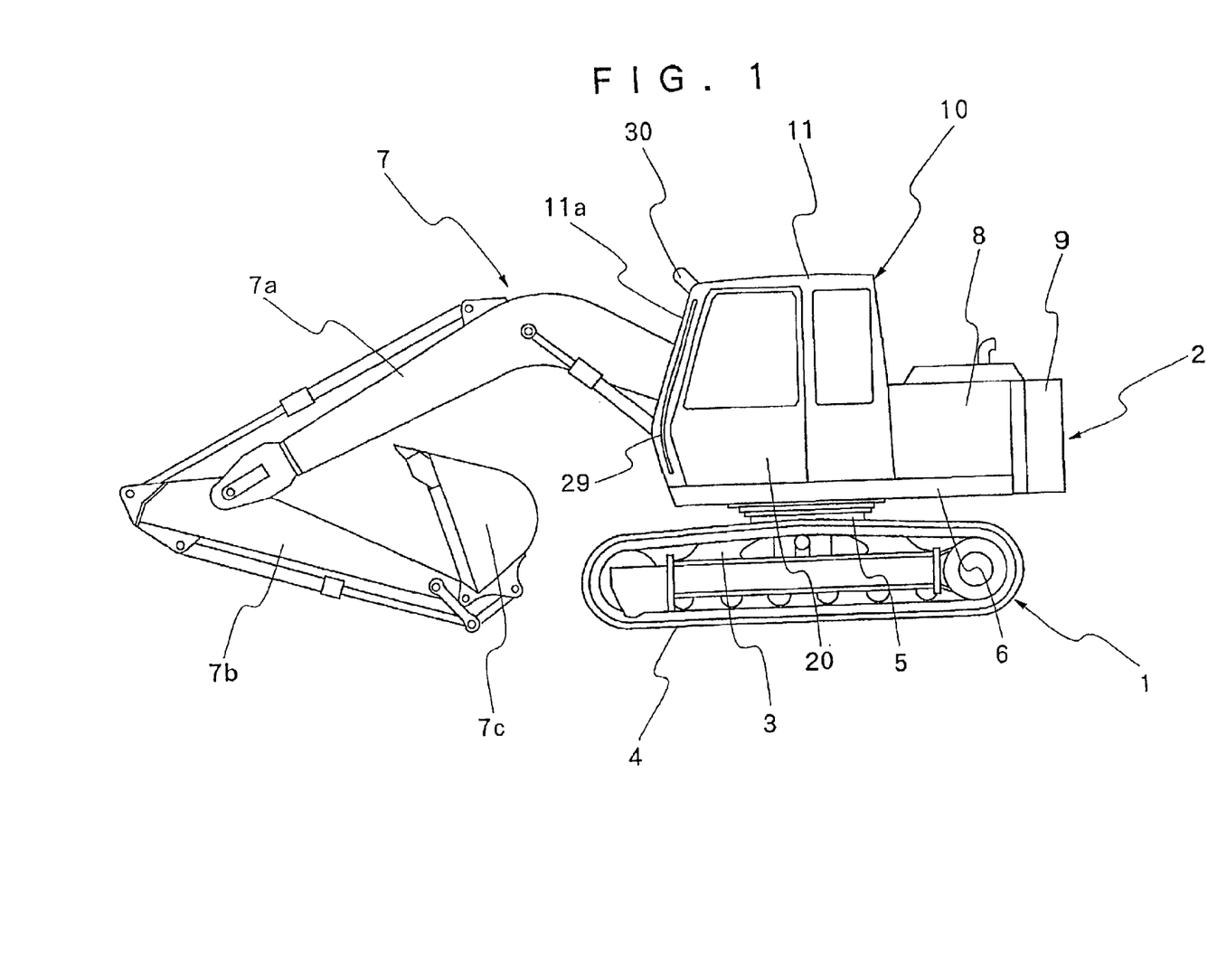
FIG. 1 is a schematic side view of a hydraulic power shovel type excavator, shown as a typical example of construction machines.
Figure 2:
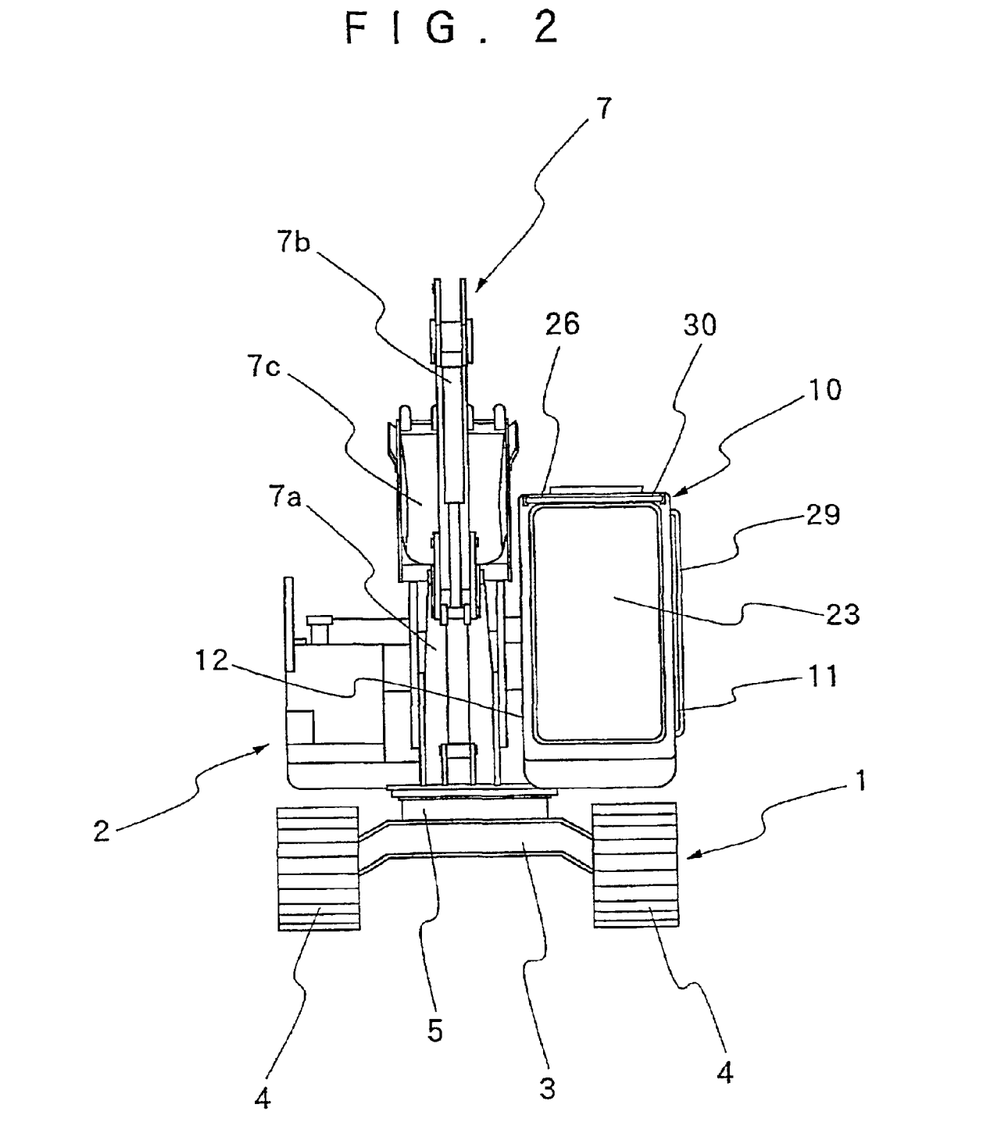
FIG. 2 is schematic front view of the excavator of FIG. 1.

As clear from FIGS. 1 and 2, the hydraulic power shovel type excavator is of a traveling type, and constituted by a vehicular base carrier 1 and an upper rotary body 2. The base carrier 1 is provided with a vehicle frame 3, and right and left crawlers 4 are mounted on and along the right and left sides of the vehicle frame 3, respectively. The upper rotary body 2 is mounted on the vehicle frame 3 through a rotary mechanism 5, so that a rotary frame 6 of the upper rotary body 2 is rotatable relative to the base carrier 1. Mounted on the rotary frame 6 is a front working mechanism 7, including a boom 7a, an arm 7b and a bucket or a front attachment 7c which are driven respectively by a hydraulic cylinder. The front working mechanism 7 is operated, for example, for excavating a ground. Further, an equipment housing 8 is provided on the rotary frame 6 to accommodate an engine, hydraulic pump and other equipments of the machine. Attached to the rear end of the rotary frame 6 is a counterweight 9 as a weight balance relative to the front working mechanism 7.

Indicated at 10 is a cab which is provided on a front portion of the rotary frame 6 side by side with the front working mechanism 7. More specifically, on a front portion of the rotary frame 10, the cab 10 is located on the left side and the front working mechanism 7 is located on the right side. In order to reduce the body width of the excavator as much as possible, the cab 10 and the front working mechanism 7 are located at a minimum distance from each other. Although not shown in the drawings, an operator's seat is provided within the cab 10, along with operating means such as operating levers and a control box, which are located in positions in the vicinity of the operator's seat. Therefore, an operator who is seated on the operator's seat in the cab can control operations of the excavator as a whole.

Figure 3:
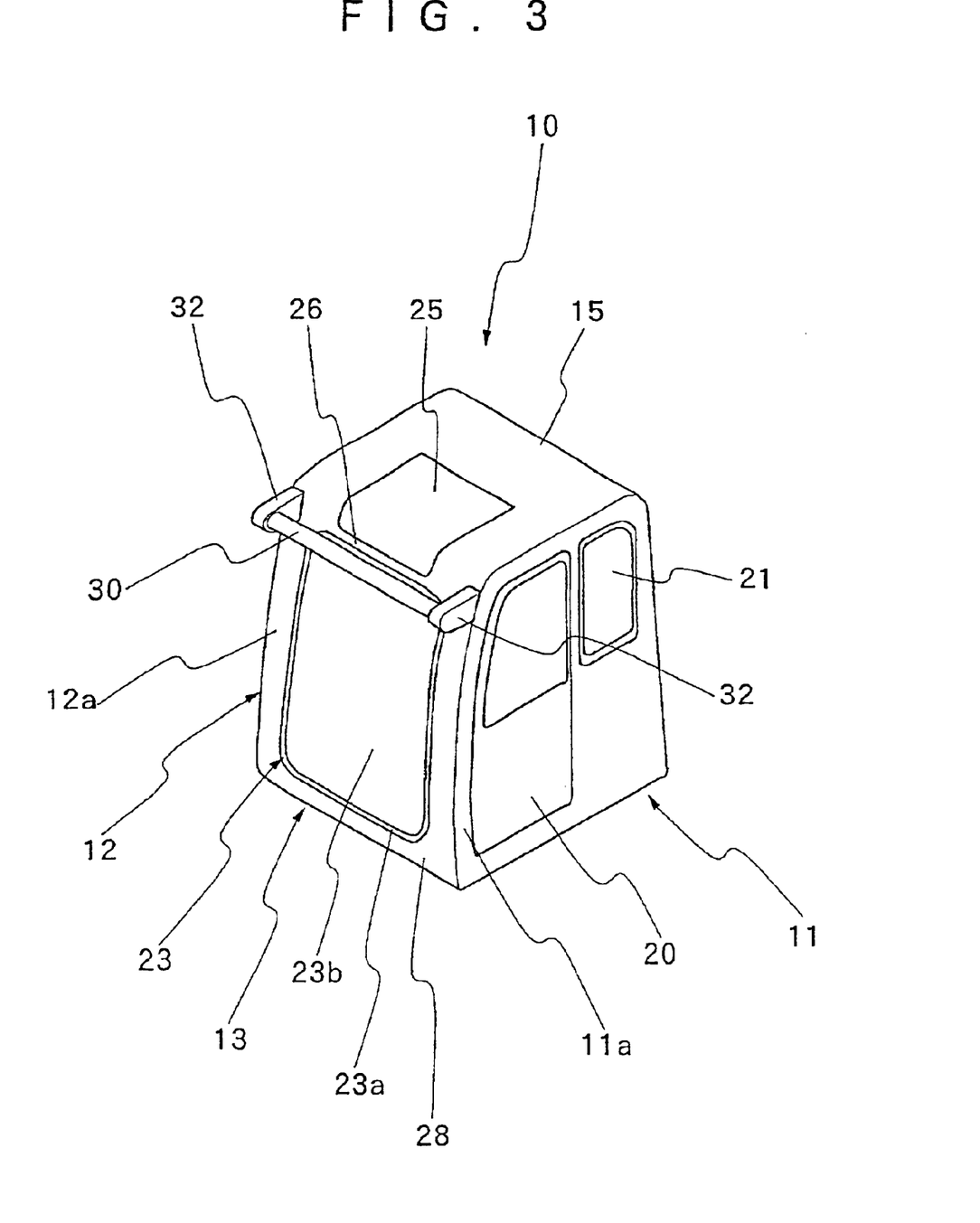
FIG. 3 is a schematic outer view of a cab embodying the present invention.
Figure 4:
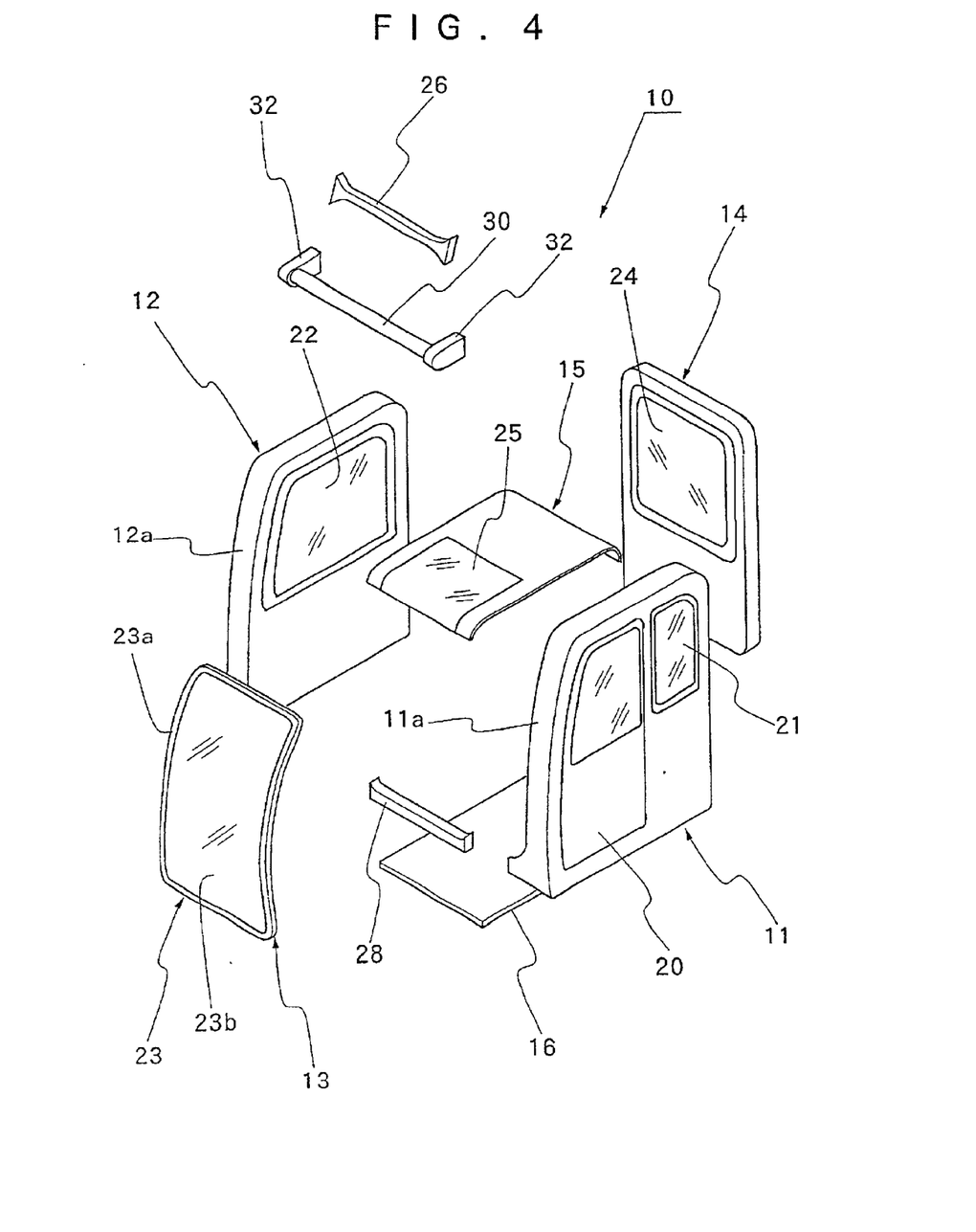
FIG. 4 is an exploded perspective of the cab of FIG. 3.

Reference is now had to FIG. 3, an outer view of the cab 10, and to FIG. 4, an exploded view of major components of the cab 10. As seen in these figures, the cab 10 is constituted by right and left side sections 11 and 12, a front section 13, a rear section 14, a roof section 15 and a floor section 16. The cab 10 provides a substantially closed room for amenity to the operator.

Of the right and left side sections 11 and 12, the left side section 11, which is located on the side away from the front working mechanism 7, is constituted by a first side frame structure which contains a door 20 with a window to permit an operator to get into or out of the cab 10 therethrough. On the other hand, a side window 21 with a pane of transparent glass is fitted on the rear side of the door 20. In contrast, the other side section 12, confronting face to face with the front working mechanism 7, is constituted by a second side frame structure with a side window 22. The front section 13 of the cab 10 is entirely occupied by a window 23 having a pane of transparent glass 23b fitted in a window frame 23a. The rear section 14 of the cab is constituted by a rear frame structure 14 which contains a rear window 25 at least above the level of the top end of the equipment housing 8 which is located on the rear side of the cab 10. Further, the roof section 15 contains a roof window 25 in its front portion. The floor section 16 is constituted by a steel panel. Various operating means are located on the front side of an operator's seat which is mounted on the floor section 16, and a control box is located at one side of the operator's seat.

In this manner, the enclosure of cab 10 contains a wide window on four sides and on the top side to provide as broad a view field as possible in all directions for the operator in the cab 10, that is to say, to minimize dead angles for the operator at the control of the excavator. The front working mechanism 7, which is extended out to perform an excavating operation at a position forward of the operator in the cab 10, is movable up and down over a wide angular range. Therefore, it is necessary for the operator to have the whole locus of movement of the front working mechanism 7, especially the whole range of movement of the bucket 7c constantly in his or her view field. In this regard, a wide view field is guaranteed for the operator in the cab 10, through the front window 23 which occupies almost the entire areas of the front section 12 and the roof window 25 which is provided in front portions of the roof section 15. Since the cab 10 is provided a wide window on all sides, the operator in the cab can check for existence of an obstacle or of other workers in a working range of the front working mechanism 7 during rotation of the upper rotary body 2.

While the excavator is in operation, the whole machine body can be shaken largely by vibrations, or rocks and fragments of concrete may drop on the cab 10. Besides, there are possibilities of the cab being collided against an ambient structure or trees. Therefore, the cab should have sufficient strength and durability. To meet this requirement, the first and second side frame structures 11 and 12 as well as the rear frame structure 14 of the cab is provided with pillars and a tie beam. These pillars and tie beam are each in the form of a hollow columnar structural material which is formed by folding and joining by welding a plural number of relatively thin steel sheets. The use of hollow structural members contributes to impart higher strength to the pillars and tie beams and to reduce the weight of the cab 10 as a whole.

Figure 5:
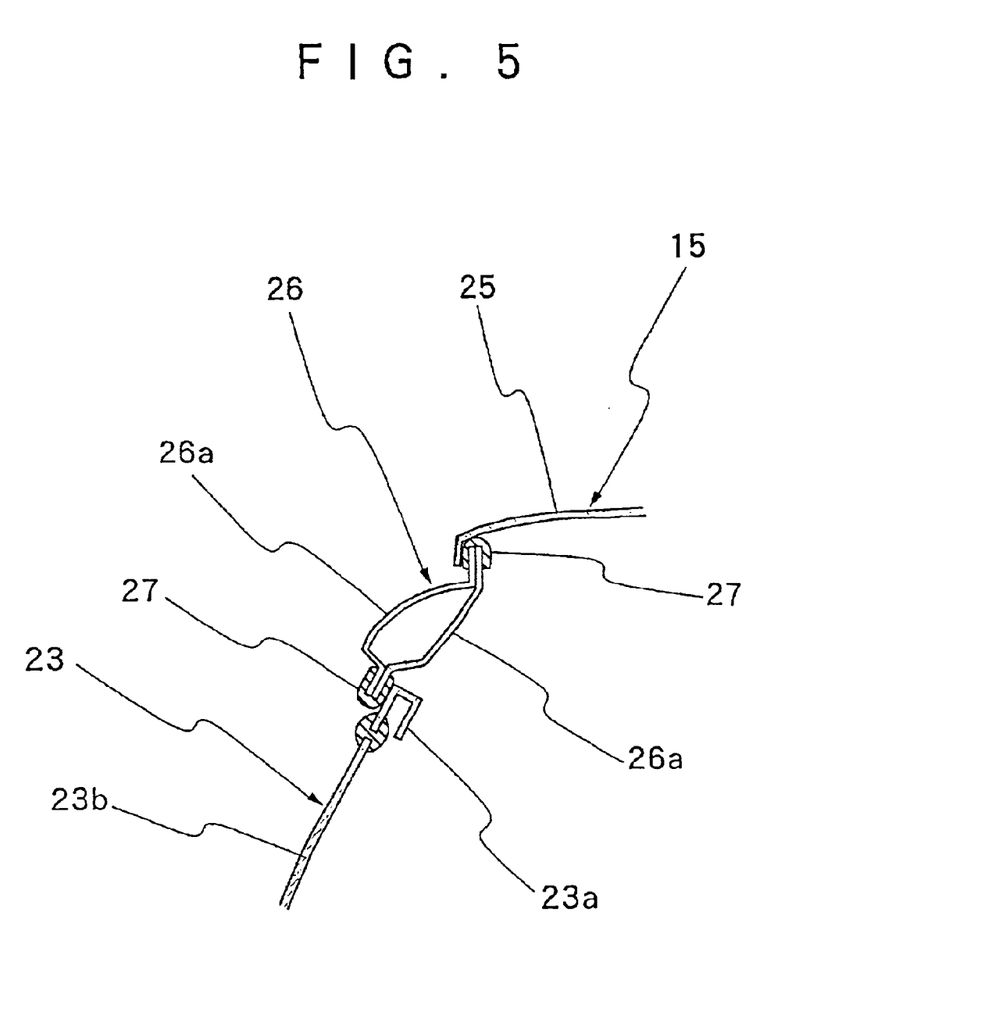
FIG. 5 is a fragmentary sectional view of a joint portion of front and roof sections of the cab.

On the rear side of the cab 10, the rear frame structure 14 is securely connected between the first and second side frame structures 11 and 12 to provide a reliably strong structure. On the other band, on the front side of the cab 10, the front section 13 and the roof section 15 are provided between the first and second side frame structures 11 and 12. The front section 13 and the roof section 15 are joined with each other through a joint structure as shown in FIG. 5. As seen in the drawings, the front section 13 is constituted by the coextensive front window 23, while the roof window 25 in the roof section 15 is extended to the front edge of the roof section 15. In order to increase strength against compressive loads on the first and second side frame structures 11 and 12, a cross beam member 26 is bridged between upper front corners of the side frame structures 11 and 12.

In one of particular examples shown in the drawings, the cross beam member 26 is in the shape of a hollow beam structure which is formed by welding together a couple of steel sheets 26a and 26b which are curved in a concave shape in intermediate portions between upper and lower joined edges. Seal members 27 are fitted on and along upper and lower joined edges of the cross beam 26, in intimate contact with inner surface of the roof window 25 and the window frame 23a of the front window 26, respectively. The opposite ends of the cross beam member 26 are secured to front pillars 11a and 12a of the first and second side frame structures 11 and 12 by welding or by other fixation means. The cross beam member 26 may be provided as an independent member, or may be arranged to form part of the roof section 15 if desired. However, it is difficult to provide the cross beam member 26 integrally with the front section 13 of the cab because the front window 23 which occupies virtually all of the entire front section 13 is normally required to be openable. In this respect, it is the general practice to move the front window in a vertical direction at the time of opening and closing same. Further, as shown in FIG. 4, another cross beam member 28 is provided under the front window 23. This lower cross beam member 28 is bridged between lower front corner portions of the first and second side frame structures 11 and 12.

Various loads are possibly imposed on the cab 10, but a load of extremely great magnitude is imposed on the cab 10 especially at the time of a fall. For instance, when a power shovel type excavator is operating on a sloped ground or on a heap of destruction debris, it always has a possibility of losing balance and falling on the ground depending upon working conditions of the machine. There is little possibility of a falling load directly acting on the cab 10 in case the excavator is caused to fall down on the side of the front working mechanism 7. However, when the power shovel type excavator happens to fall down on the opposite side of its body, upper portions of the cab 10 are caused to collide strongly against a ground surface to receive a falling load of extremely large magnitude in a compressing direction for the cab 10.

Therefore, the cab 10 should be sturdy enough at least to evade serious deformation or collapsing in case it is subjected to a load of extremely large magnitude like the falling load. The rear frame structure 14 which is provided at the rear side of the cab 10 is strong enough in this regard, while the cross beam member 26 is provided as a reinforcing member on the front side of the cab 10. However, if the cross beam member 26 alone were to support all of imposed loads, it may become necessary to a cross beam member 26 of a large size which would block the view field of the operator in the cab 10 to an objectionable degree.

Figure 6:
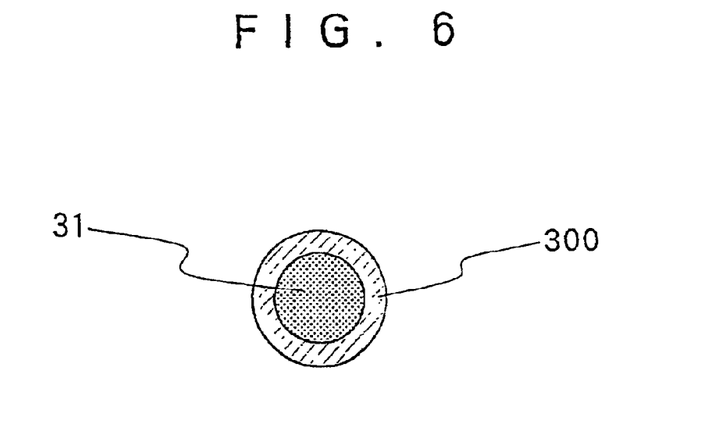
FIG. 6 is a sectional view of a reinforcing member.
Figure 7:
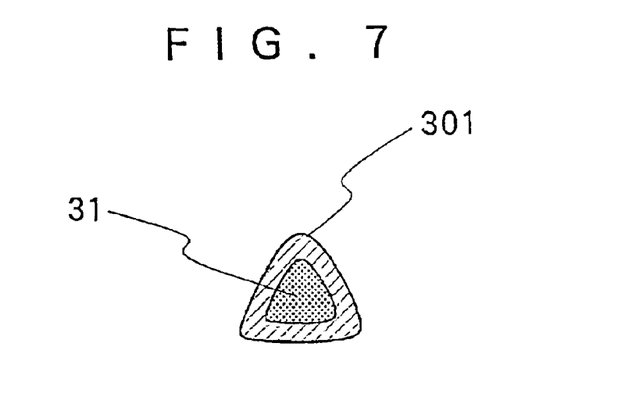
FIG. 7 is a sectional view of a modified reinforcing member.

Therefore, for reinforcing the front side of the cab 10 to protect same from an extremely large load which would otherwise cause serous deformation or collapsing to the cab 10, a reinforcing structure to be employed should be arranged to guarantee a wide view field for the operator as much as possible. For this purpose, according to the present embodiment of the invention, a reinforcing beam member 30 is provided at the front side of the cab 10 substantially in parallel relation with the cross beam 26. In this instance, the reinforcing member 30 is in the form of a hollow metallic rod-like structure like a steel pipe, and, may be arranged to present either a circular shape as indicated at 200 in FIG. 6 or a triangular shape as indicated at 301 in FIG. 7. No matter whether the shape of the reinforcing beam member 30 is circular or triangular, it is desirable to fill the internal cavity of the reinforcing beam member 30 with a foamed synthetic resin like foamed urethane resin for the purpose of enhancing its bending strength.

Figure 8:
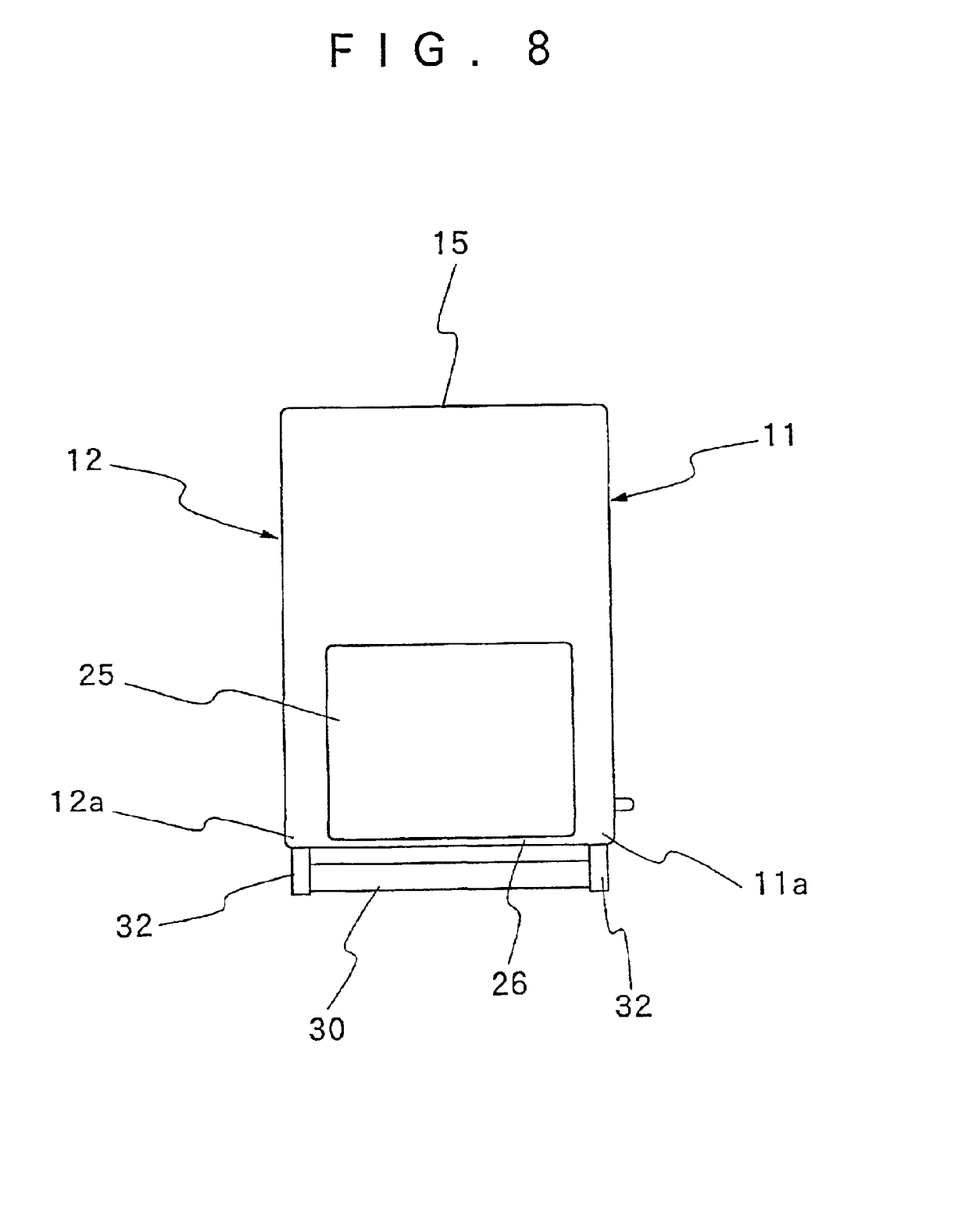
FIG. 8 is a schematic plan view of the cab having a reinforcing member attached thereto.
Figure 9:
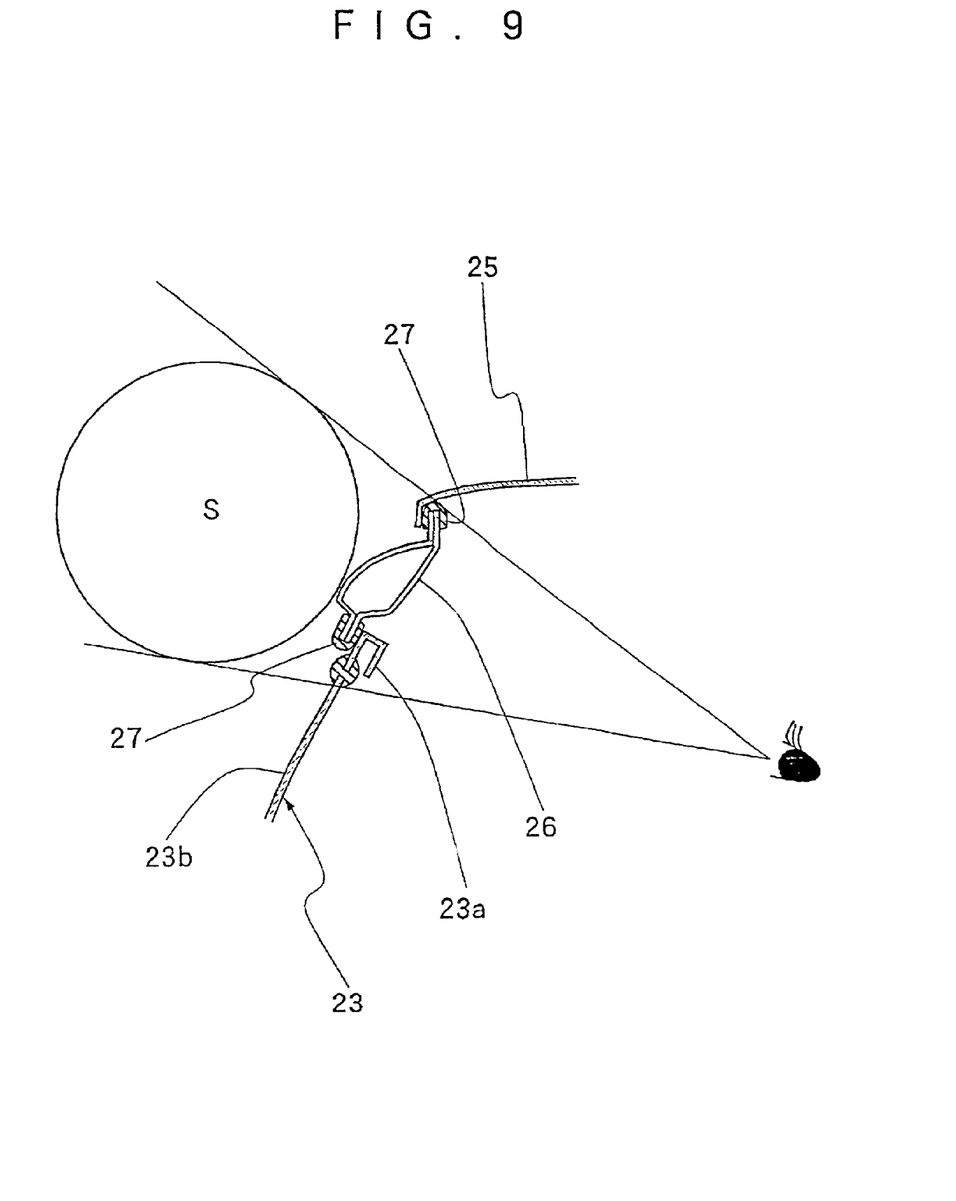
FIG. 9 is a schematic illustration explanatory of relations between the position of the reinforcing member on the cab and an operator's view field.

As shown particularly in FIG. 8, the opposite ends of the reinforcing beam member 30 are connected to and supported by brackets 32, which are securely welded to upper front portions of pillars 11a and 12a of the first and second side frame structures 11 and 12. In this regard, it is most desirable to set the reinforcing beam member 30 in a position within a hidden space S where the reinforcing beam member 30 is almost entirely concealed behind the cross beam 26 when an operator who is seated on the operators looks up toward the cross beam member 26. However, since the angle of the hidden space S changes more or less depending upon the seated height of the operator, desirably the reinforcing beam member 30 is located in such a position where a major part of the reinforcing member 30 is concealed behind the cross beam 26 when viewed by an operator of an average seated height.

The greater the diameter of the reinforcing beam member 30, the stronger becomes its strength. However, if the diameter of the reinforcing member 30 is thickened to a large excessive degree, it can bulge out from behind the cross beam member 26 to narrow the view field of the operator to some extent depending upon the viewing position of the operator. However, a reinforcing beam member 30 of a large diameter can be suitably located to fall substantially within the concealed space S behind the cross beam 26 without restricting the view field of the operator to any material degree, in case the reinforcing beam member 30 is shifted to a position which is at a greater distance from the cross beam member 26. Accordingly, a reinforcing beam member 30 of a suitable diameter can be employed from the standpoint of strength, and, in order to guarantee a broad view field for the operator, its mounting position is shifted in an obliquely upward direction from the cross beam 26 depending upon its diameter.

Figure 10:
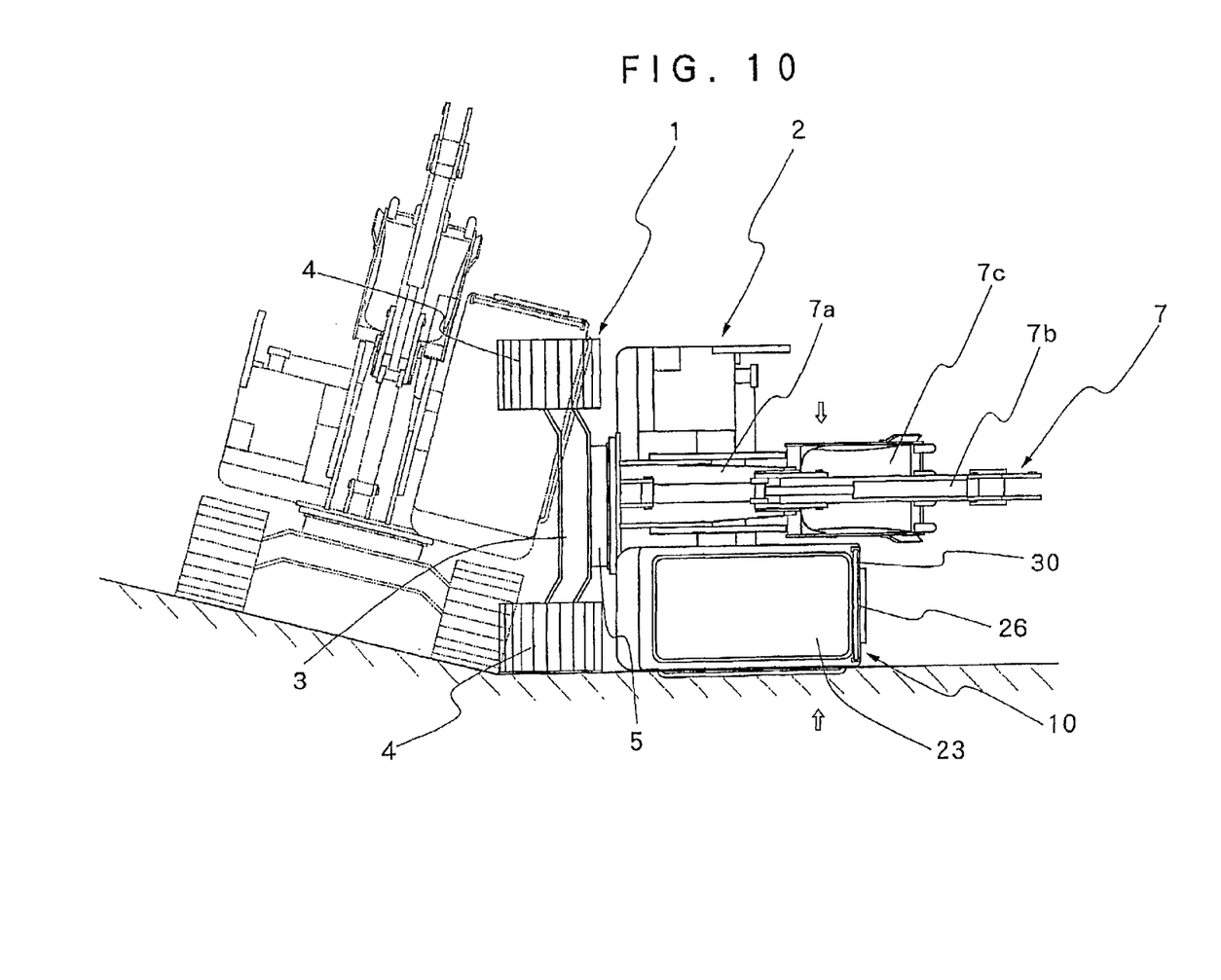
FIG. 10 is a schematic illustration explanatory of a manner in which an excavator is caused to fall down on the ground.

For instance, suppose that a power shovel type excavator happens to lose balance and fall down on the ground while it is operating on a sloped ground as indicated by two-dot chain line in FIG. 10. In this case, an extremely large falling load is imposed on the machine as indicated by an arrow, tending to compress the cab 10 between the ground and the boom 7a of the front working mechanism 7. However, the imposed falling load is effectively supported by the cross beam 26 and the reinforcing beam member 30 to prevent crucial collapsing or crushing of the cab 10. Namely, the shape retainability of the cab 10 under a falling load can be improved to a considerable degree to insure safety of an operator within the cab 10.

Thus, although the reinforcing beam member 30 is located in a position obliquely upward of an operator in the cab 10, it is almost concealed behind the cross beam member 26 in overlapping relation with the latter. Therefore, there is little possibility of the reinforcing beam member 30 blocking a forward or upward view field of the operator who is operating the front working mechanism 7, for example, for excavating earth at a height or for loading excavated earth onto a dump truck. Accordingly, the operator can operate the front working mechanism safely in a smooth and accurate manner. Besides, thanks to the provision of the reinforcing member 30 of high strength, it becomes possible to reduce the diameter or thickness of the cross beam member 26 which is no longer primarily depended upon for strength. This means that a view field of an operator in the cab 10 can be broadened further and dead angles in the operator's view field can be suppressed to minimum. Further, the provision of the reinforcing beam member 30 in addition to the cross beam member 26 contributes to suppress vibrations of the cab which is shaken during operation of the power shovel type excavator, particularly, to suppress vibrations of front portions of the first and second side frame structures. It follows that the provision of the reinforcing beam member 30 also contributes to suppress noises and to prevent accelerated deteriorations of sealing effects by the seal members 27.

Figure 11:
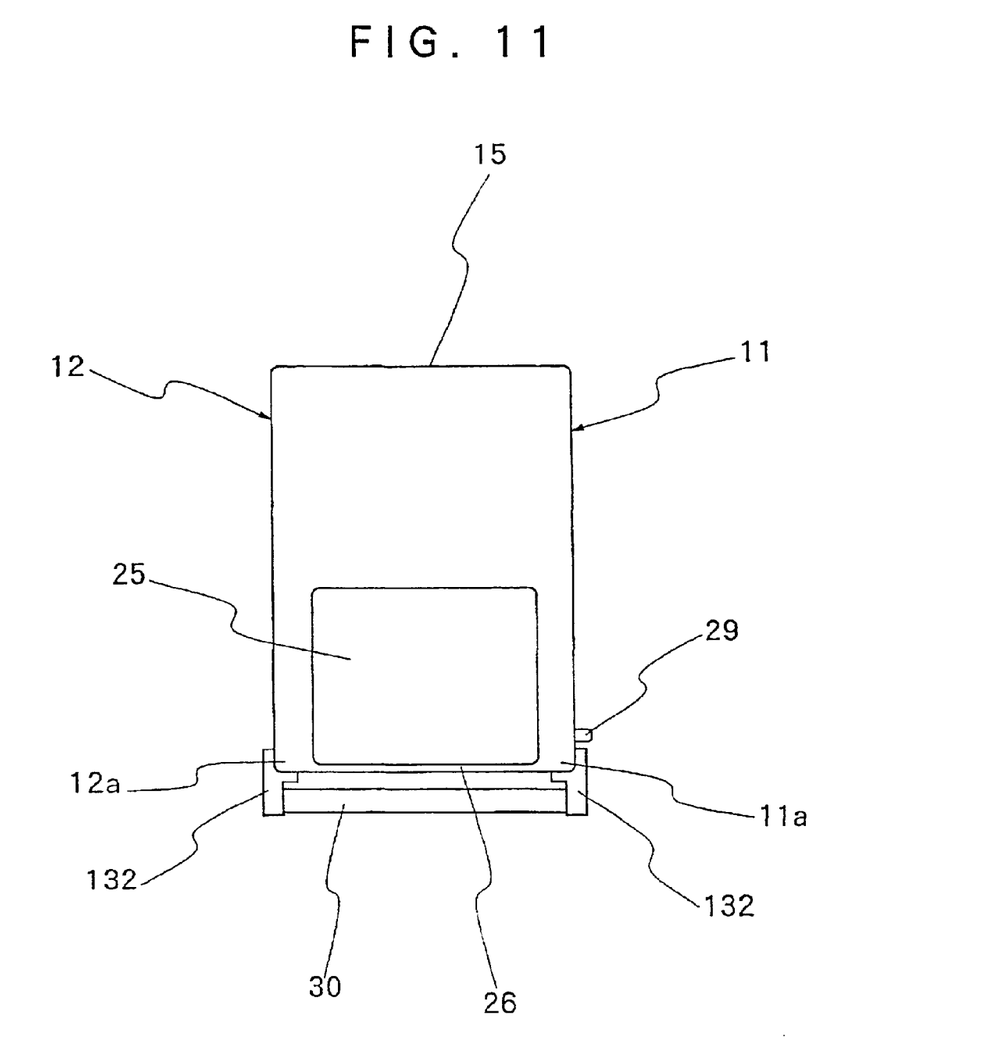
FIG. 11 is a schematic plan view of a cab having a reinforcing member attached thereto in a different manner from the cab of FIG. 8.

The reinforcing beam member 30 can be mounted fixedly in position on the front side of the pillars 11a and 12a by the use of the mount structure as shown in FIG. 8. However, in order to let the reinforcing beam member 30 support a falling load before the cross beam member 26, it may be mounted in position by the use of brackets 132 as shown in FIG. 11. In this case, the brackets 132 are securely fixed to the pillars 11a and 12a in such a way as to hold outer corner portions of the latter and are thick enough to project laterally on the outer side of the first and second side frame structures 11 and 12, respectively. In this connection, it has been the general practice to provide a handrail 29 on the pillar 11a of the first side frame structure 11 to assist an operator at the time of climbing up into or climbing down from the cab 10. In such a case, from the standpoint of vehicle body width in transportation, it is desirable that the lateral projection of the bracket 132 does not exceed such a handrail.

Figure 12:
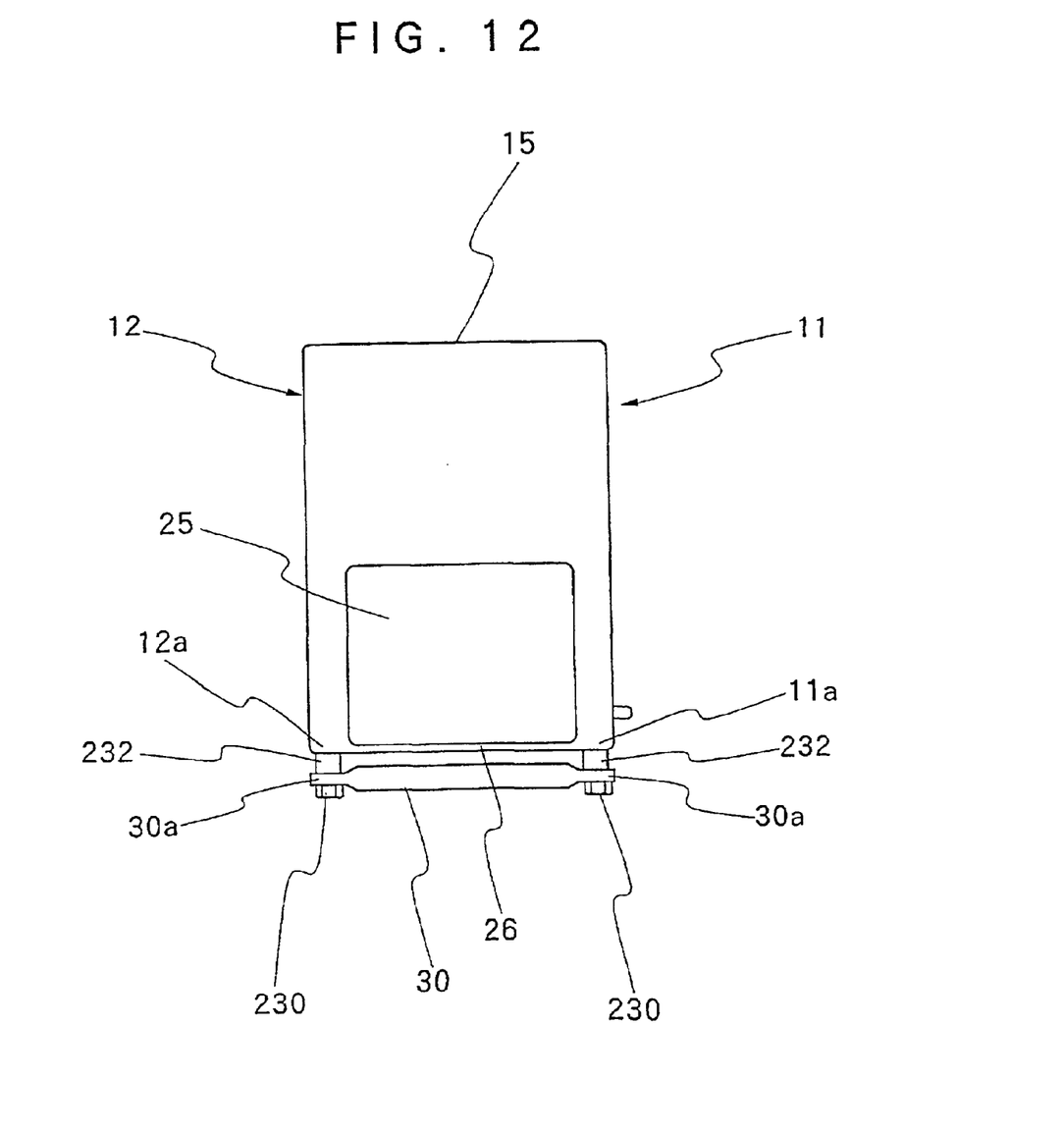
FIG. 12 is a schematic plan view of still another cab having a reinforcing member attached thereto in a manner different from FIGS. 8 and 11.

Alternatively, the reinforcing beam member 30 can be mounted in the manner as shown in FIG. 12. In this case, the reinforcing beam member 20 has flattened portions 30a at its opposite ends, while mount members 232 are securely welded to the front pillars 11a and 12a of the first and second side frame structures 11 and 12. The flattened opposite end portions 30a of the reinforcing beam member 30 are securely fixed to the mount members 232 by means of bolts 230.

Figure 13:
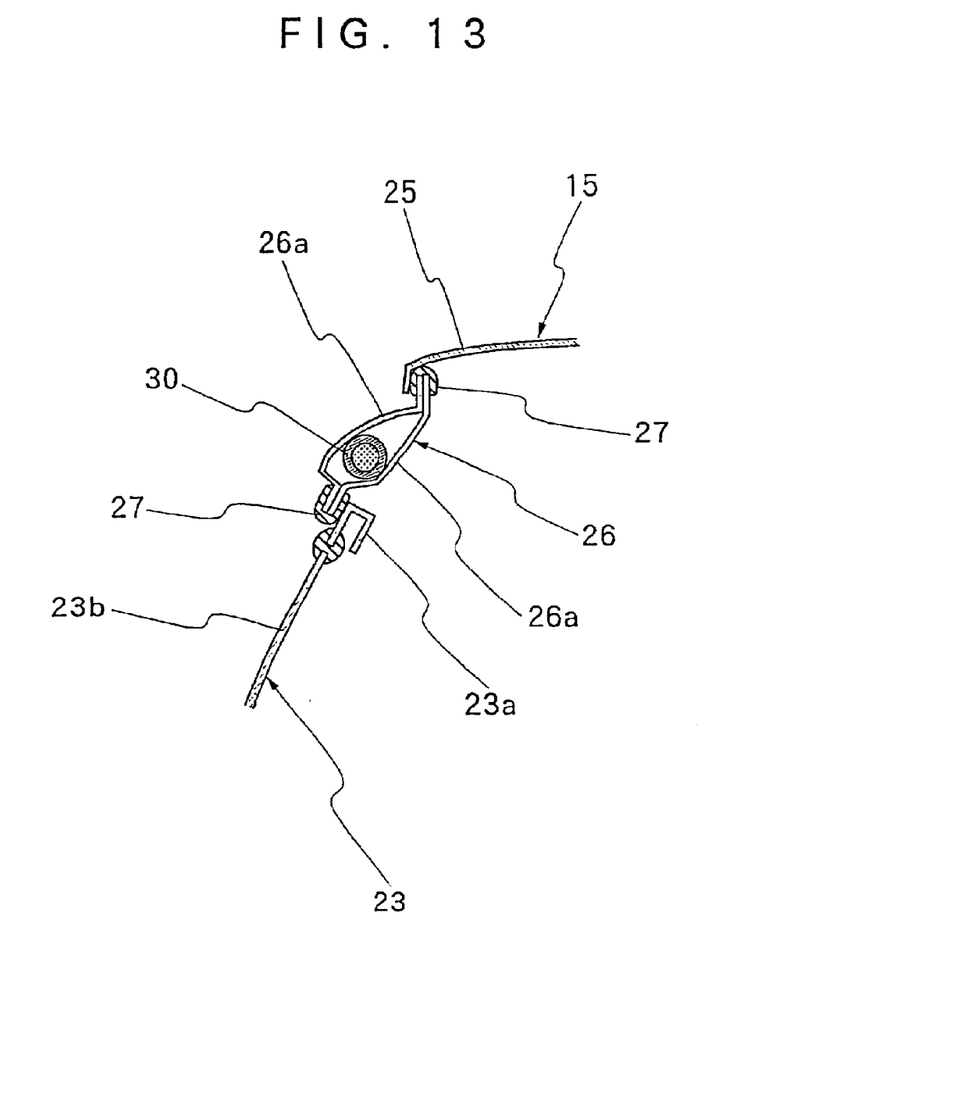
FIG. 13 is a sectional view similar to FIG. 5, but showing another modification of the reinforcing member.

Further, since the cross beam member 26 is in the form of a hollow structural material, the reinforcing beam member 30 can be passed through the internal cavity of the hollow cross beam member 26 as shown in FIG. 13. In this case, the reinforcing beam member 30 which is totally concealed in the cross beam member 26 has no possibility of blocking a view field of an operator.

Figure 14:
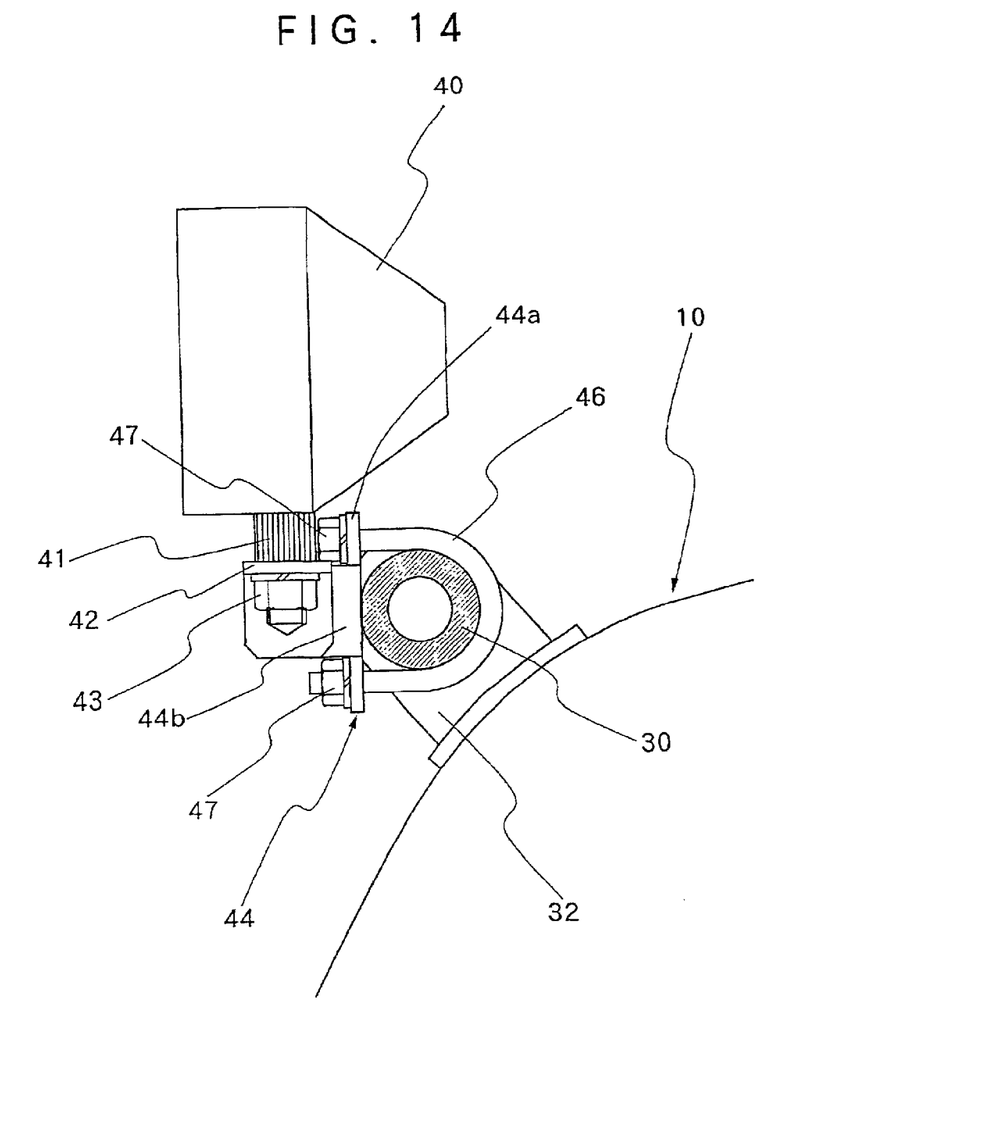
FIG. 14 is a fragmentary front view of a cab having head light assemblies mounted thereon.
Figure 15:
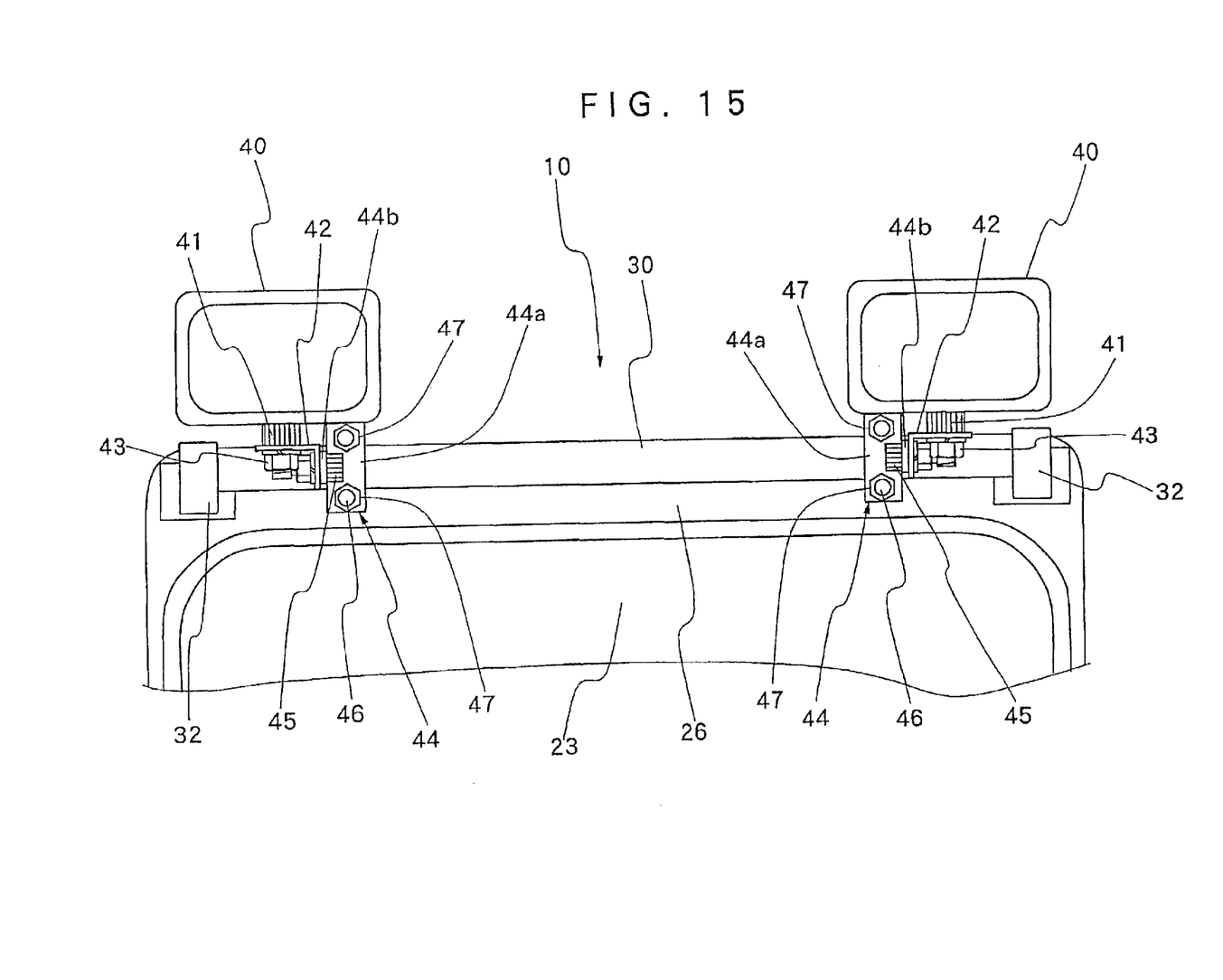
FIG. 15 is a schematic view taken in the direction of arrow A in FIG. 14, showing the head light assemblies mounted on the cab.

The reinforcing beam member 30 is a structural member of high strength which is projected forward from an upper front portion of the cab 10. Therefore, it can also serve as a member for mounting various accessories such as lighting equipment, mirrors, rock protector covers against dropping rocks or stones, sun shades, wipers etc. For example, lighting lamp assemblies 40 can be mounted on the reinforcing beam member 30 as shown in FIGS. 14 and 15.

As clear from these figures, each lighting lamp assembly 40 has a connecting shaft member 41 on the lower side. The lower end of the connecting shaft 41 is terminated with a screw portion of a reduced diameter. The screw portion at the lower end of the connecting shaft 41 is passed through a horizontal section of a bracket 42 of a rectangular inverted L-shape, and a nut 43 is threaded on the screw portion of the connecting shaft 41 to set the lamp assembly 40 fixedly on the support plate 42. The other vertical section of the bracket 42 is securely fixed by a screw 45 to a flat fore extension 44*b* of a support plate 44, which is bent through 90 degrees relative to a main body portion 44*a* of the support plate 44. The main body portion 44*a* of the support plate 44 is provided with a pair of apertures in vertically aligned positions to receive screw portions at the fore ends of a U-shaped clamp member 46 which is fitted on the reinforcing beam member 30. Clamp nuts 47 are threaded onto the screw portions of the clamp member 46 to fasten the support plate 44 tightly against the reinforcing beam member 30.

If desired, a plural number of similar lighting lamp assemblies 40 can be mounted in arbitrary positions along the reinforcing beam member 30 in the same manner. By loosening the nut 43, the connecting shaft member 41 can be turned to adjust the lighting direction of the lamp assembly 40 in the horizontal direction. Besides, by loosening the screw 45, the lamp assembly 40 can be turned up or down in the vertical direction. After adjusting the lighting lamp assembly 40 into a desired position and direction, the clamp nut 45 is tightened against the support plate 44, and then the screw 45 and nut 43 are tightened to fix the lamp assembly 30 in position.

Possibilities of Industrial Utilization

With the construction machine cab construction according to the present invention as described above, crucial deformation or collapsing of the cab is prevented even in case a load of an extremely large magnitude like a falling load is imposed on the cab, because the imposed load is effectively supported by the reinforcing beam member. Besides, despite the reinforcement of the cab strength by addition of the reinforcing beam member, an operator in the cab can have a broad view field in all of necessary directions in operating the front working mechanism of the machine, and thus can control the construction machine including the front working mechanism efficiently without sacrificing safety of operation to any degree whatsoever.

What is claimed is:

1. A cab for a construction machine, being mounted on an upper rotary body of said construction machine along with a working mechanism and providing an operating room within an enclosure comprising a first side frame structure containing a door to be opened and closed by an operator, a second side frame structure located on the side of said working mechanism, a front section provided between front ends of said first and second side frame structures and substantially entirely occupied by a front window, a roof section, and a rear section, wherein said cab comprises:

a cross beam member bridged between upper front corners of said first and second side frame structures in such a way as to form a boundary between said front window and a top window in said roof section to ensure maximum visibility in an obliquely upward direction through said front and top windows; and a reinforcing beam member of a rod-shaped metal pipe and of an annular shape in cross section, said reinforcing member being provided between said first and second side frame structures and on the outer side of and in parallel relation with said cross beam member, said reinforcing beam member being located in an obliquely upwardly projected position relative to said cross beam member to be seen at least in a partly overlapped relation with said cross beam member when viewed by an operator in said cab.

2. A cab for a construction machine as defined in claim 1, wherein said reinforcing beam member is bridged between brackets securely fixed to a front side of foremost pillars of said first and second side frame structures.

3. A cab for a construction machine as defined in claim 1, wherein said reinforcing beam member is bridged between brackets securely fixed to a lateral side of foremost pillars of said first and second side frame structures.

4. A cab for a construction machine as defined in claim 1, wherein said reinforcing beam member is adapted to mount thereon an accessory of said construction machine.

5. A cab for a construction machine as defined in claim 4, wherein said accessory is a lighting lamp assembly.

6. A cab for a construction machine as defined in claim 1, wherein said reinforcing beam member has a foaming synthetic resin material filled in an internal cavity thereof.

* * * * *